May 28, 1957  V. E. MATULAITIS  2,794,152
ARC-MACHINING
Filed June 15, 1953  3 Sheets-Sheet 1

INVENTOR.
Victor E. Matulaitis.
BY
ATTORNEY.

May 28, 1957 V. E. MATULAITIS 2,794,152
ARC-MACHINING
Filed June 15, 1953 3 Sheets-Sheet 2

INVENTOR.
Victor E. Matulaitis.
BY
ATTORNEY.

May 28, 1957 V. E. MATULAITIS 2,794,152
ARC-MACHINING

Filed June 15, 1953 3 Sheets-Sheet 3

INVENTOR.
Victor E. Matulaitis.
BY
ATTORNEY.

United States Patent Office 2,794,152
Patented May 28, 1957

2,794,152

ARC-MACHINING

Victor E. Matulaitis, Franklin, Mich., assignor to Elox Corporation of Michigan, Clawson, Mich.

Application June 15, 1953, Serial No. 361,730

22 Claims. (Cl. 315—171)

This invention relates to the art of arc-machining, sometimes referred to as "metal disintegrating," "spark-machining," or "electrical discharge-machining."

My principal object is to provide a method and apparatus capable of producing machined surfaces having better finish and accuracy than those produced heretofore by arc-machining techniques.

Another object is to effect an increase in the rate of stock removed by arc-machining.

Still another object is to improve the safety of operation of arc-machining equipment.

A further object is to provide an arc-machining apparatus wherein means is provided for limiting the instantaneous voltage across the arc gap to a maximum predetermined relatively low voltage regardless of the magnitude of the supply voltage.

A still further object is to provide in such an apparatus, means for limiting the maximum voltage across the gap to a relatively low voltage for efficient machining with optimum accuracy and surface finish while providing a relatively high supply voltage for rapid condenser charging.

Use of arc-machining in industry has grown rapidly in recent years, particularly for machining hard alloys such as tungsten carbide which are extensively used for making dies. I have found that arc-machining circuits having a capacitance shunted across the gap (such as that shown in simplified form in Fig. 1) are particularly satisfactory. I have also determined that for best results, so far as accuracy of dimension and surface finish are concerned, the voltage appearing across the gap should be not less than approximately twenty-five volts and not greater than approximately fifty volts. If a lower voltage is used, the arc (or spark-discharge as it is sometimes called) tends to become unstable and if a higher voltage is used, dimensional control and surface finish deteriorate rapidly.

If such relatively low voltages are employed as a source voltage for the apparatus, charging of the condenser is slow and the power that can be put into the arc is limited, consequenlty the cutting rate is low. It is then obvious that it would be highly desirable to provide a high voltage source for condenser charging, but limit the arc voltage to a lower voltage, in the order of 40 volts.

The apparatus illustrated and described herein accomplishes this desirable object in a practical and commercially feasible manner.

Other objects and advantages will become apparent from the following discussion and description of illustrative forms of my invention.

In the drawings accompanying the description, in which reference characters have been used to designate like parts referred to in the description.

Figure 1:
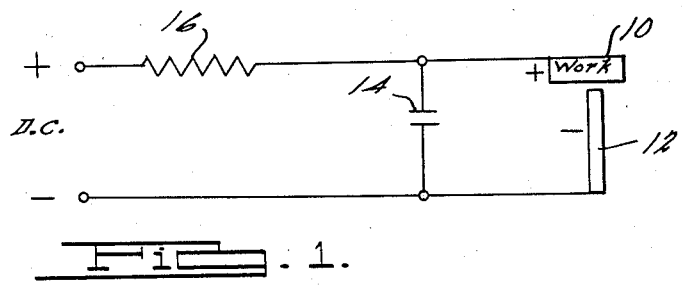
Fig. 1 is a schematic circuit diagram of a basic arc-machining circuit.
Figure 2:
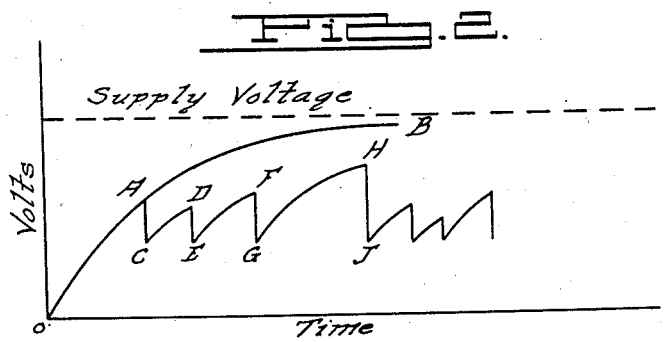
Fig. 2 is a graphic representation of the operating characteristics of the Fig. 1 circuit during operation thereof at relatively low voltage.
Figure 3:
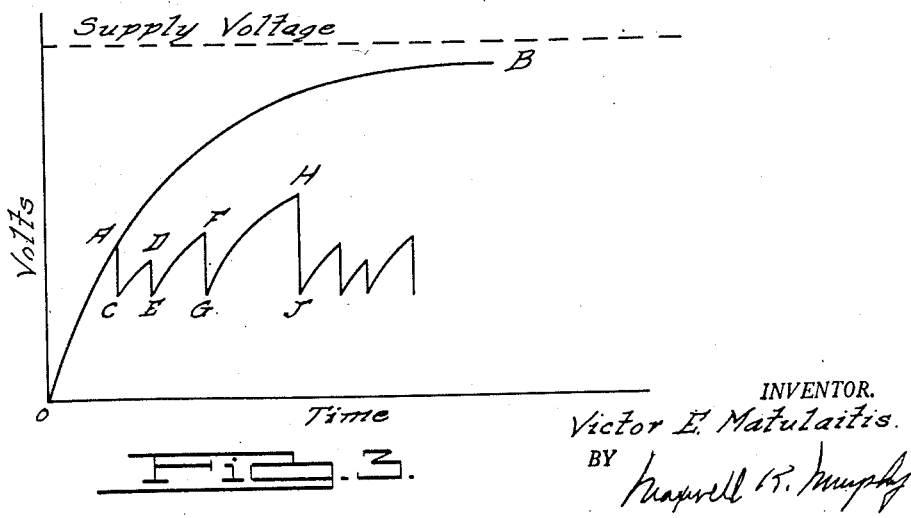
Fig. 3 is a graphic representation of the operating characteristics of the Fig. 1 circuit when operated at relatively high voltage.

Referring now to Figs. 1, 2, and 3, it may be seen that the basic circuit used in a typical arc-machining apparatus comprises a constant potential D. C. source, one side of which is connected to a workpiece 10 and the other side to an electrode 12. Preferably, the positive side is connected to the workpiece through a resistor 16 and a capacitor 14 is shunted across the gap between the work and electrode.

The electrode may be vibrated axially or it may be fed in a unidirectional manner toward the work, it being understood that coolant, such as water or other solution, but preferably dielectric solution, is maintained on and around the area of the work being eroded. By proper choice of constants for the capacitor 14 and the resistor 16, the flow of current across the gap may be made pulsating in nature.

The pulsating current flow is easily understood by reference to Fig. 2. Assuming that when the Fig. 1 circuit is established, the electrode 12 is spaced a sufficient distance from the workpiece 10 to prevent a discharge across the gap, then the difference of potential between the electrode and workpiece will increase exponentially with respect to time such as is shown by the curve OAB. Sufficient lapse of time will permit the difference of potential across the gap to reach a value equal to that of the source. However, in the operation of arc-cutting machines, the spacing of the electrode and work is normally such that an electrical discharge occurs across the gap before the potential difference thereacross reaches a value approaching the source. This point is designated by A in the graph.

The discharge is accompanied by a flow of current derived principally from capacitor 14, which has been previously charged, and as the capacitor 14 discharges, the potential difference across the arc gap falls rapidly. Usually the capacitor will not completely discharge because at some voltage lower than the discharge voltage the arc will be interrupted and the capacitor 14 will immediately start to recharge through the resistor 16. Point C on the graph designates this occurrence. When the capacitor 14 again reaches a voltage high enough to cause an arc-discharge across the gap, the phenomenon is repeated and this repetitive action continues as graphically indicated by A, C, D, E, F, G, etc., as long as the electrode and work are maintained in suitable relation.

The potential difference at which the material-removing electrical-discharge occurs, indicated at A, D, F and H, is a function of and is affected by the material of the electrode, the material of the workpiece, the surface roughness of the two, the nature of the coolant in the gap and, most important of all, the spacing between the electrode and the work. It may be stated generally that as the gap distance is increased, the voltage across the gap must also increase to maintain the intermittent arcing necessary for stock removal.

It should be noted that the potential difference which exists across the gap at the instant the arc is interrupted, indicated by points C, E, G, J, etc., is substantially uniform compared to the discharge voltage indicated at A, D, F, H, etc., and this voltage besides being affected by the factors noted above is a function of the value of the capacitor 14.

Generally speaking, in the arc-machining circuit of Fig. 1, there is a minimum critical value of resistance for resistor 16 for any chosen value of capacitor 14 at specified voltage. If the value of 16 is less than the critical minimum, the continuous cyclic action represented by the curves of Figs. 2 and 3 will be interrupted by the appearance of relatively prolonged D. C. arcs between the workpiece and electrode. When this occurs, operation of the apparatus becomes erratic, speed of cutting decreases and quality of surface finish diminishes.

Furthermore, it may be stated that for any chosen value of capacitor 14, and with resistor 16 adjusted to the minimum critical value corresponding to the applied voltage, the Fig. 1 circuit will operate with improved efficiency as the applied voltage is increased. This behavior may be explained in the following manner. As the minute individual protuberances or projections of the workpiece are machined away by successive arcs, the instantaneous spacing between the electrode and the workpiece becomes random rather than fixed. Consequently, the voltage across the gap at the instant of arc formation is also variable, sometimes being low, as represented by D in Figs. 2 and 3, and at other times being high, as represented by H. It can also be shown that the time interval GJ for attainment of a relatively high voltage H becomes increasingly longer with decreasing magnitude in supply voltage. For this reason, it is preferable that the operating voltage applied to the circuit be several times as great as the peak voltages occurring across the gap in normal operation.

The maximum supply voltage which can be used with the circuit of Fig. 1 is limited by two factors. Firstly, while the magnitude of the supply voltage has little bearing on operation during actual cutting, the use of a relatively high voltage supply is definitely detrimental at the times when a cut is started, or completed, and when a short-circuit condition between the electrode and work is cleared.

If a high voltage is used, the voltage which will appear across the gap as the electrode approaches the work at the start of a machining operation will about equal the supply voltage (B in Figs. 2 and 3). This means that as the cut is initiated, the power attendant the first few condenser discharges will be appreciably greater than the power of the condenser discharges once a steady machining rate has been achieved, and since the rate of material removal is related to the power of the individual electrical discharges, surface roughness will be worse at the beginning of the cut than will be the case as the cutting progresses. This same decrease in the quality of surface finish will be noted each time a short circuit between the electrode and work is cleared inasmuch as the gap between the two following the clearing of a short-circuit is in most instances equal to that present at initiation of cutting.

Figures 8, 9:
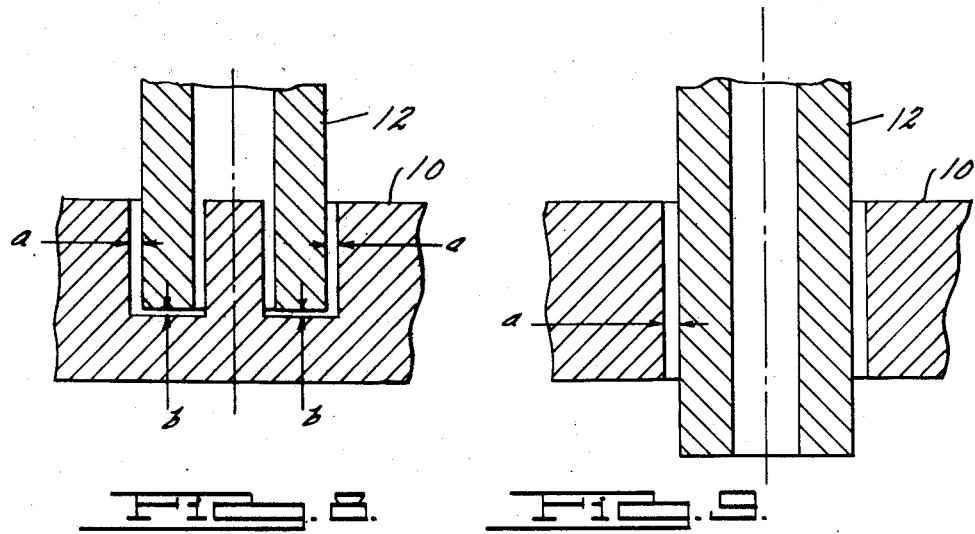
Fig. 8 is a diagrammatic showing of a section through the electrode and workpiece during one phase of an arc-machining operation, the clearances being exaggerated to increase clarity.
Fig. 9 is a view like Fig. 8 during another phase in the operation.

Thus when a relatively high supply voltage is used, the surface finish may be good during all of the cut except at the start and finish and a considerable portion of the surface finish is frequently lost at the finish because of the phenomenon illustrated in Figs. 8 and 9.

Referring to those figures, it will be understood that during the course of the cutting operation the voltage existing between the electrode and work is that across the gap $b$. At this time the radial gap $a$ is somewhat greater than the end gap $b$ and therefore most of the cutting takes place at the end of the electrode. Relatively little (and preferably no) arcing occurs across gap $a$ because the path across gap $b$ prevents the voltage difference between the electrode and workpiece from attaining sufficient magnitude to fire across gap $a$.

When, however, in the illustrated example of drilling a hole, the end gap $b$ disappears by the electrode breaking through the work, the voltage will rise in value and arcing will occur across gap $a$ with consequent pitting of the surface of the bore.

The second factor operating to limit the magnitude of the supply voltage as a practical matter has to do with operator safety. Obviously if electrode 12 and workpiece 10 are sufficiently removed from one another such that there are no electrical discharges therebetween, the difference of potential between the two will equal the full value of the supply voltage and the operator of the machine is exposed to liability of dangerous shock should he attempt to work on the apparatus.

From the foregoing, it is clear that while a high supply voltage is desirable to attain a high rate of material removal, it is impractical and possibly dangerous to permit such a voltage to appear across the gap under all conditions and at all times of operation.

Figure 4:
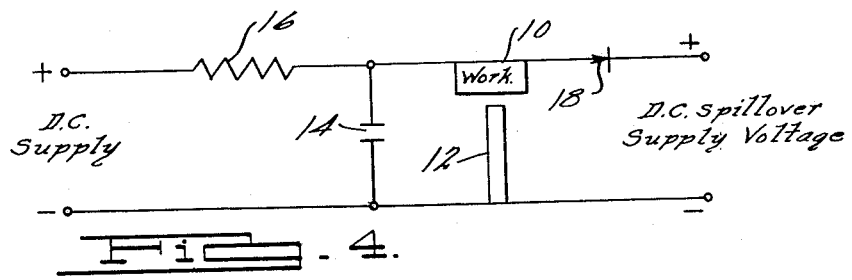
Fig. 4 is a schematic circuit diagram of an improved arc-machining circuit incorporating my invention.

In Fig. 4, I have shown a circuit which avoids the objectionable features just pointed out, yet permits use of a high voltage supply with its inherent advantages.

It will be noted that the Fig. 4 circuit is similar to the Fig. 1 circuit except that a second source of voltage is provided. This second voltage source is called the "spill-over" voltage and it is connected into the circuit through a rectifier 18 in such manner that current can flow from the workpiece 10 into the spill-over source when, and only when, the voltage across the gap tends to exceed the spill-over voltage. During normal operation of the apparatus, the gap voltage will be lower than the spill-over voltage and due to the blocking action of the rectifier 18, no current will flow into or out of the spill-over voltage source except for the negligible reverse rectifier current. This negligible reverse rectifier current does not affect the operation of the circuit.

Figure 5:
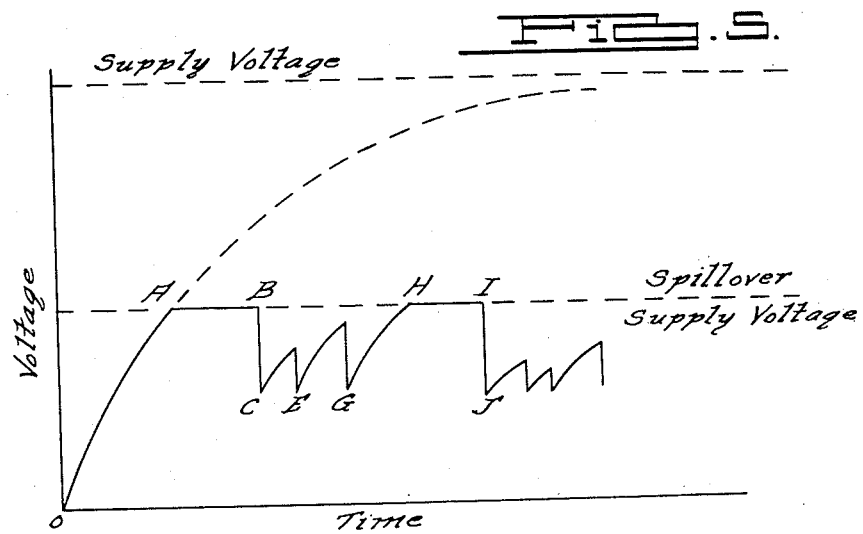
Fig. 5 is a graphic representation of the operating characteristics of the Fig. 4 circuit.

The rectifier 18 acts as a "block" or "clamp," in that it permits current flow in one direction only, i. e. toward the spill-over source, and prevents the voltage across the gap from ever rising above the magnitude of the spill-over supply. Fig. 5 is a diagrammatic representation of the operation of the Fig. 4 circuit.

Here, as in Figs. 2 and 3, the difference of potential across the gap between the electrode and workpiece rises exponentially with respect to time when the main supply voltage is applied: see curve OA. At this instant, the electrode 12 is being fed toward workpiece 10 (or vice versa) and the two are separated to such an extent that no arcing occurs. The condenser 14 will charge immediately and the voltage across the gap will tend to rise to the value of the main source. In this circuit, however, this cannot occur because as soon as the voltage across the gap rises to a value slightly higher than that of the spill-over voltage, current flows through the spill-over circuit, and the result is that a constant voltage, substantially equal to the spill-over voltage, is impressed across the gap. This is represented by the portion AB on the curve of Fig. 5. Point B denotes the instant when the electrode approaches the work sufficiently close to cause arcing at which time normal cutting begins.

Normal operation of the circuit will continue, as denoted by the portion of the curve B, C, D, E, F, etc., until a short-circuit occurs between the electrode and work or the latter are withdrawn to such an extent that voltage of magnitude exceeding the value of the spill-over voltage would be required to continue the arcing. During this period of so-called normal operation, the spill-over circuit does not function because the voltage across the gap does not rise to a value sufficient to pass current through the rectifier 18.

Should a short circuit occur or the gap be abnormally widened, the condenser 14 will, of course, tend to be charged to a voltage equal to that of the main supply; this being prevented and the charging of the condenser interrupted by operation of the spill-over circuit as shown by the portion HI of the curve. Line IJ represents resumption of normal operation.

A typical voltage supply for the circuit depicted by Fig. 2 would be 35 to 40 volts maximum. For the circuit depicted by Fig. 3, the maximum voltage of the supply would be from 80 to 300 volts. By using a circuit like that of Fig. 4, a main voltage supply of 40 to 300 volts may be used without danger and with excellent operation and results. With such a main supply of voltage, a spill-over source of 25 to 40 volts would be used. The voltage across the gap then could never exceed 40 volts, while the higher voltage of, say, 200 to 300 could be used to provide rapid condenser charging with consequent fast cutting rate.

The importance of the spill-over feature for limiting the gap voltage upon surface finish may be demonstrated by giving consideration to the energy dissipation during cutting. Generally speaking, the size of the eroded crater in the work for each electrical discharge is proportional to the energy dissipated. This may be expressed as follows:

$$WS \text{ is proportional to } \tfrac{1}{2} (E_1^2 - E_2^2)$$

where:

WS is watt-seconds of energy.
$E_1$ is condenser voltage at points D, F, etc.
$E_2$ is condenser voltage at points C, E, G, etc.

Assuming the value of $E_1$ to be 200 volts and the value of $E_2$ to be 10 volts, then:

$$(WS \text{ is proportional to } \tfrac{1}{2} (40{,}000 - 100)$$
$$\text{or } 19{,}950$$

During normal operation of the circuit depicted in Fig. 3 (with a 200 volt main supply) the peak condenser voltage at points A, D, F, etc. is approximately 30 volts. Then:

$$WS \text{ is proportional to } \tfrac{1}{2} (900 - 100)$$
$$\text{or } 400$$

In the above example, the ratio of energy dissipation and consequently the size of the cut for each discharge is approximately 50 to 1.

With a 40 volt spill-over limiting voltage connected into the circuit, such as shown in Figures 4 and 5, the relationship is as follows:

$$WS \text{ is porportional to } \tfrac{1}{2} (1{,}600 - 100)$$
$$\text{or } 750$$

During normal operation at 30 volts:

$$WS \text{ is proportional to } \tfrac{1}{2} (900 - 100)$$
$$\text{or } 400$$

In this example the ratio of energy dissipation is less than 2 to 1. Obviously then, the surface finish of the hole or cut in the latter example will be more uniform than in the first example given.

While the Fig. 4 circuit is perfectly satisfactory in operation and illustrates the operation and advantages of the invention, it requires two separate sources of D. C. power and, during the period the spill-over circuit is functioning, a portion of the power being drawn from the main circuit is dissipated and wasted.

Figure 6:
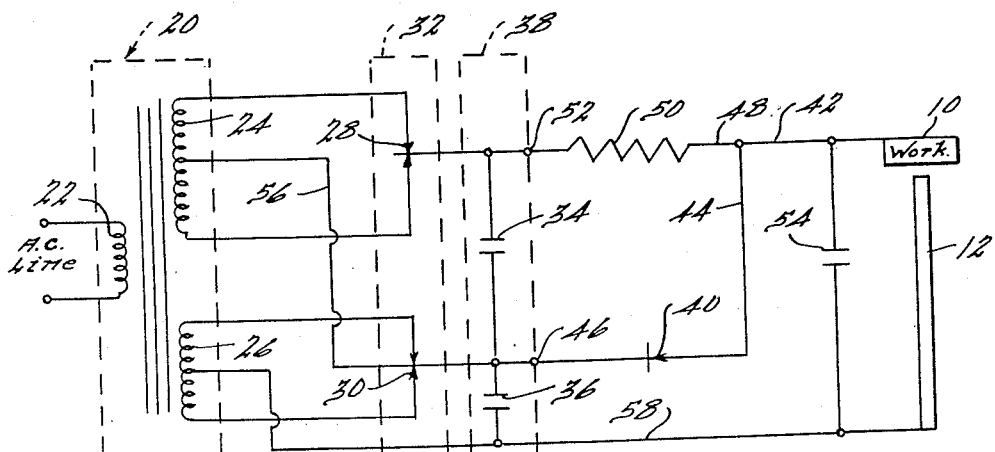
Fig. 6 is a schematic diagram of a modified circuit incorporating the invention.

In Fig. 6, I have illustrated schematically a preferred circuit which requires only one source of power and avoids wastage of power. In this apparatus the main power supply is drawn from an A. C. line through a transformer 20. The latter has a primary 22 and two secondaries 24 and 26 respectively. The secondaries are series connected in full-wave arrangement with the elements 28 and 30 of a rectifier 32 and are filtered in turn by the condensers 34 and 36 of the capacitor assembly 38.

A rectifier 40 is connected between workpiece 10 and output terminal 46. The workpiece is also connected through conductors 42, 48 and resistor 50 to the other output terminal 52. A third condenser 54 is connected across the gap. The center tap of the secondary 24 is connected to the output of rectifier element 30 by conductor 56 while the center tap of secondary 26 is connected to the electrode 12 by conductor 58.

It may be seen then that, during so-called normal machining, the outputs of the two secondaries of transformer 20 are additive, the gap between electrode 12 and work 10 being such that the gap difference of potential never exceeds the voltage appearing at output terminal 46; consequently no current flows through terminal 46 because of the blocking action of rectifier 40. The curernt flow during this phase of operation is as follows: From the center tap of secondary winding 24, through rectifier element 28, terminal 52, resistor 50, conductor 42, condenser 54, conductor 58, center tap of secondary 26, rectifier element 30, and to secondary 24 through conductor 56. However, upon establishment of any abnormal condition in the circuit, such as initiation of machining, completion of machining, abnormal spacing in the gap or clearing of a short-circuit, the spill-over portion of the circuit becomes instantly operative to neutralize power flow from the secondary winding 26 and power is supplied to the condenser 54 by the secondary winding 24 only. Under these conditions, the principal current flow in the circuit is as follows:

Starting at the center tap of winding 24 of transformer 20, current flows through said winding to rectifier element 28, thence through terminal 52, resistor 50, conductor 44, rectifier 40, terminal 46, and conductor 56 back to said center tap. During this phase, the power circuit from secondary winding 26 acts to maintain a substantially constant biasing voltage across condenser 54 and the gap between workpiece 10 and electrode 12, but little or no power flows.

Figure 7:
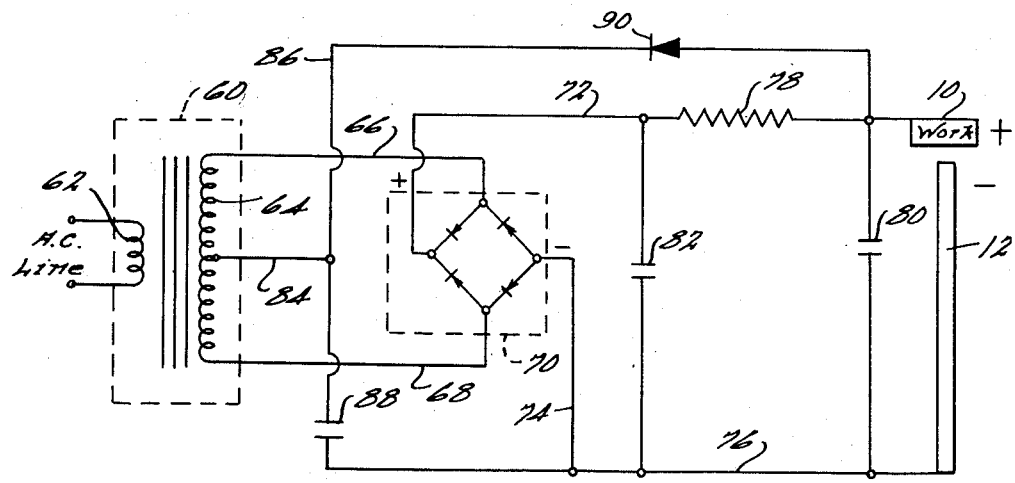
Fig. 7 is a schematic diagram of a further modification.

Fig. 7 is a simplified circuit which attains results equivalent to the circuits of Figs. 4 and 6, and is preferred in some applications. In this circuit, the transformer 60 has a primary winding 62 and a single secondary winding 64 connected by conductors 66, 68, to a bridge type rectifier 70. The output terminals of the latter are connected by conductors 72, 74, 76, to the work 10 and electrode 12 respectively. A current limiting resistor 78 is connected in the positive side of the circuit and a charging condenser 80 is shunted across the gap as usual. A filtering condenser 82 is connected across the terminals of rectifier 70.

The spill-over portion of the circuit is completed by connecting the center tap of the secondary winding 64 to the conductor 76 and to the positive side of condenser 80 by means of conductors 84 and 86. A filter condenser 88 is interposed in the conductor 76 adjacent the winding 64 and a rectifier 90 is connected in the conductor 86 to block flow of current in one direction.

Tracing the circuit will show that no current can flow from the center tap of winding 64, but current will flow from the workpiece 10 through rectifier 90 and conductors 86 and 84 any time that the instantaneous voltage across the gap tends to exceed approximately one-half the voltage appearing across filter condenser 82. At such times the current flow is as follows: From the center tap of winding 64, through the winding to rectifier 70, thence through conductor 72, resistor 78, rectifier 90 and conductors 86 and 84 back to the center tap.

It may be seen that this circuit is somewhat special in that, because the secondary 64 is tapped at the center, the spill-over voltage will always be approximately one-half of line or supply voltage.

In the above, and in the appended claims, when the term "arc" is used, an electrical discharge of extremely short duration is meant, such being sometimes referred to in the art as a "spark-discharge." When the terms "relatively low voltage" and "relatively high voltage" or similar terms are employed, voltages in the order of 25–50 volts and 200–300 volts respectively are meant.

It will thus be seen that I have illustrated and described several circuits and apparatus for arc-machining which achieve the objects set forth in the beginning of the specification. It is to be understood that the embodiments described and the examples given are for illustrative purposes only and are not to be construed as the only forms the invention may assume. The principles set forth herein are applicable in many of the circuits and machines currently used in arc-machining and the scope of my invention is intended to be limited only as set out in the appended claims.

I claim:

1. In an apparatus for removing material from a workpiece by means of electrical discharge, an electrode and means for causing intermittent electrical discharge across a gap between said electrode and a workpiece, a condenser connected across said gap, a power supply of predetermined voltage, means rendering said power supply continuously effective in the electrical circuit of said apparatus for charging said condenser and means limiting the instantaneous voltage across the gap to a predetermined value substantially lower than the supply voltage.

2. The combination set forth in claim 1, wherein the power supply voltage is in the order of 200 to 300 volts and the maximum gap voltage is in the order of 25 to 50 volts.

3. In an apparatus for removing material from a workpiece by means of electrical discharge, an electrode and means for causing intermittent electrical discharge across a gap between said electrode and a workpiece, a charging circuit including a source of D. C. voltage connected in series with a condenser, a discharging circuit including said condenser the negative terminal thereof being connected to the electrode and the positive terminal thereof being connected to the workpiece, and means including a source of bucking voltage for limiting the instantaneous voltage across the gap between the electrode and workpiece to a predetermined value substantially lower than the supply voltage.

4. The combination set forth in claim 3, wherein the supply voltage is in the order of 200 to 300 volts and the maximum voltage between the electrode and workpiece is in the order of 25 to 50 volts.

5. In an apparatus for removing material from a workpiece by means of electrical discharge, an electrode and means for causing intermittent electrical discharge across a gap between said electrode and a workpiece, a power source of relatively high voltage, a second voltage source of predetermined lower voltage, and means actuated by said second voltage source for limiting the instantaneous voltage across the gap.

6. The combination set forth in claim 5, wherein the second voltage source is derived from and is a component of the power source.

7. In an apparatus for removing material from a workpiece by means of electrical discharge, an electrode and means for causing intermittent electrical discharge across a gap between said electrode and a workpiece, a power source of relatively high voltage, a second voltage source of predetermined lower voltage, and means actuated by said second voltage source for limiting the instantaneous voltage across the gap to a value substantially lower than the supply voltage.

8. The combination set forth in claim 7, wherein the second voltage source is derived from and is a component of the power source.

9. In an arc-machining apparatus having an electrode and means for causing intermittent electrical discharge across a gap between said electrode and a workpiece for removing material from said workpiece, a main circuit for supplying D. C. power at predetermined voltage to said electrode and workpiece, a spill-over circuit of predetermined lower voltage connected to said electrode and workpiece and means in said spill-over circuit preventing power flow from said circuit to said electrode and workpiece but permitting power flow from said main circuit into said spill-over circuit, whereby the voltage across the gap between said electrode and workpiece is limited to substantially the value of the spill-over voltage.

10. In an arc-machining apparatus having an electrode and means for causing intermittent electrical discharge across a gap between said electrode and a workpiece for removing material from said workpiece, a capacitance connected in parallel with said electrode and workpiece, a source of voltage connected across said capacitance, a second source of voltage of relatively lower magnitude connected across said electrode and workpiece, and means associated with said low voltage source permitting power flow in one direction only.

11. The combination set forth in claim 10, wherein the means associated with the low voltage source permits power flow from the higher voltage source to the low voltage source only.

12. In an arc-machining apparatus having an electrode and means for causing intermittent electrical discharge across a gap between said electrode and a workpiece for removing material from said workpiece, a capacitance connected across the gap between the electrode and workpiece, a transformer having a primary winding, a first secondary winding and a second secondary winding, means including a directional current limiting device connecting said secondary windings with said capacitance, said electrode and said workpiece such that while the sum of voltages across said secondary windings is constantly available to charge said capacitance, the voltage across said gap is limited to the voltage across one secondary winding only.

13. The combination set forth in claim 12, wherein said directional current limiting device comprises a rectifier.

14. The combination set forth in claim 12, wherein a current limiting resistor is connected in the output circuit of said secondary windings.

15. In an arc-machining apparatus having an electrode and means for causing intermittent electrical discharge across a gap between said electrode and a workpiece for removing material therefrom, a capacitance connected across said gap, a power transformer having first and second secondary windings, a pair of rectifiers connected respectively across said secondary windings, means connecting the positive side of one rectifier to said workpiece, means connecting the center tap of said second secondary winding to said electrode, and means connecting the negative side of the second rectifier to the center tap of said first secondary winding.

16. The combination set forth in claim 15, wherein the positive side of the second rectifier is connected to the positive side of said capacitance through a current directional limiting device.

17. The combination set forth in claim 15, wherein filter condensers are connected across the output of said respective rectifiers.

18. In an arc-machining apparatus having an electrode and means for causing intermittent electrical discharge across a gap between said electrode and a workpiece for removing material therefrom, a capacitance connected across said gap, a power transformer having a secondary winding, a bridge-type rectifier connected across said winding, means connecting the positive side of said rectifier to said workpiece, means connecting the negative side of said rectifier to said electrode, means connecting the center tap of said winding to the negative side of said capacitance, and means connecting said center tap to the positive side of said capacitance through a directional current limiting device whereby the maximum voltage across the gap is limited to a value substantially lower than the voltage across said secondary winding.

19. The combination set forth in claim 18, wherein a current limiting resistor is connected in the positive lead from said rectifier.

20. The combination set forth in claim 19 wherein said directional current limiting device is connected between the output side of said resistor and the center tap of said winding.

21. In an arc-machining apparatus, an electrode disposed in arcing relation to a workpiece, a condenser connected across the gap between the electrode and workpiece, a source of voltage of predetermined magnitude connected across said gap, a second source of voltage of lower magnitude connected across said gap, and a one-way current conducting device connected in the circuit of said second voltage source whereby the voltage across said gap is limited in magnitude to that of said second source.

22. In an arc-machining apparatus including an electrode arranged to discharge across a gap to a workpiece and a condenser connected across the arc-gap, means for securing relatively rapid charging of the condenser without subjecting the gap to higher than normal voltage comprising a high-voltage source and a low-voltage source connected across the arc-gap in parallel and means limiting current flow to the direction from the high-voltage source to the low-voltage source only.

References Cited in the file of this patent

UNITED STATES PATENTS

| 1,200,796 | Arnold | Oct. 10, 1916 |
| 1,345,066 | Brackett | June 29, 1920 |
| 2,235,385 | Rava | Mar. 18, 1941 |
| 2,495,301 | Wengel | Jan. 24, 1950 |
| 2,526,423 | Rudorff | Oct. 17, 1950 |
| 2,589,720 | McMath | Mar. 18, 1952 |
| 2,628,330 | Williams | Feb. 10, 1953 |

FOREIGN PATENTS

| 326,463 | Italy | May 25, 1935 |